United States Patent
Farmer et al.

(10) Patent No.: US 8,712,439 B2
(45) Date of Patent: Apr. 29, 2014

(54) METHOD AND APPARATUS FOR USING SERVICE CAPABILITY INFORMATION FOR USER PLANE LOCATION

(75) Inventors: Dominic Gerard Farmer, Los Gatos, CA (US); Andreas K. Wachter, San Francisco, CA (US); Kirk Allan Burroughs, Alamo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1222 days.

(21) Appl. No.: 12/246,815

(22) Filed: Oct. 7, 2008

(65) Prior Publication Data

US 2009/0181698 A1    Jul. 16, 2009

Related U.S. Application Data

(60) Provisional application No. 61/020,635, filed on Jan. 11, 2008.

(51) Int. Cl.
    *H04W 24/00*    (2009.01)
(52) U.S. Cl.
    USPC .............. 455/456.3; 455/456.1; 455/456.2; 455/456.6; 455/457; 455/404.2
(58) Field of Classification Search
    USPC .......... 455/404.1, 404.2, 456.1, 456.2, 456.3, 455/456.6, 457
    See application file for complete search history.

(56) References Cited

U.S. PATENT DOCUMENTS

| | | | |
|---|---|---|---|
| 2004/0162052 A1* | 8/2004 | Jang et al. | 455/404.2 |
| 2005/0250516 A1* | 11/2005 | Shim | 455/456.1 |

FOREIGN PATENT DOCUMENTS

| | | |
|---|---|---|
| JP | 2004158947 A | 6/2004 |
| JP | 2007109232 A | 4/2007 |
| JP | 2007325276 A | 12/2007 |
| KR | 20060013323 A | 2/2006 |
| KR | 20070019531 | 2/2007 |
| RU | 2156552 C2 | 9/2000 |
| WO | 9722217 A1 | 6/1997 |
| WO | WO2004073318 A2 | 8/2004 |
| WO | WO-2005064981 A2 | 7/2005 |
| WO | WO2005117295 A1 | 12/2005 |
| WO | WO-2005117296 A1 | 12/2005 |
| WO | 2006118401 A2 | 11/2006 |
| WO | 2007064147 A1 | 6/2007 |

OTHER PUBLICATIONS

International Search Report—PCT/US2009/030651—International Search Authority, European Patent Office, Apr. 29, 2009.

Written Opinion—PCT/US2009/030651, International Search Authority, European Patent Office, Apr. 29, 2009.

(Continued)

*Primary Examiner* — Manpreet Matharu
(74) *Attorney, Agent, or Firm* — Linda G. Gunderson

(57) ABSTRACT

Techniques for supporting location services in a user plane location architecture such as Secure User Plane Location (SUPL) are described. In an aspect, a terminal informs a location server of service capabilities of the terminal. The location server uses the service capabilities to request only location services supported by the terminal and to avoid requesting unsupported location services. The terminal generates a message containing its service capabilities and sends the message via a user plane, e.g., SUPL. The location server receives the message, obtains the service capabilities of the terminal, and stores these service capabilities for future network-initiated location sessions with the terminal. The location server determines whether a location service is supported by the terminal based on the service capabilities of the terminal. The location server communicates with the terminal via the user plane for the location service if supported by the terminal.

23 Claims, 9 Drawing Sheets

(56) References Cited

OTHER PUBLICATIONS

Qualcomm :"AD Periodic Triggered Services for NI Proxy", China Mobile, LGE, SUPL 2.0, OMA-LOC-2006-0009-CR-SUPL-2_0-AD-Periodic-Triggered-Services-for-NI-Proxy, Jan. 27, 2006.

Qualcomm: "AD Periodic Triggered Services for SI Proxy", China Mobile, LGE, SUPL 2.0, OMA-LOC-2006-0010-CR-SUPL-2_0-AD-Periodic-Triggered-Services-for-SI-Proxy, Jan. 27, 2006.

Qualcomm: "Area Event Triggered Services for NI Proxy", SUPL 2.0 AD OMA-LOC-2006-0013-CR-SUPL-2_0-AD-Area-Event-Triggered-Services-for-NI-Proxy, Jan. 27, 2006.

Qualcomm: "Area Event Triggered Services for SI Proxy", LGE, SUPL 2.0 AD, OMA-LOC-2006-0014R01-SUPL-2_0-AD-Area-Event-Triggered-Services-for-SI-Proxy, Feb. 2, 2006.

Qualcomm,SUPL2_0_TS_ULP_SET_Information Update,OMA-LOC-2008-0029CR_SUPL2_0_TS_ULP_SET_Information_Update,Jan. 23, 2008.

Taiwan Search Report—TW098100860—TIPO—Jul. 23, 2012.

UserPlane Location Protocol, Open Mobile Alliance, Candidate Version 2.0, OMA-TS-ULP-V2_0-20080627-C, pp. 262-266, Jun. 27, 2008.

\* cited by examiner

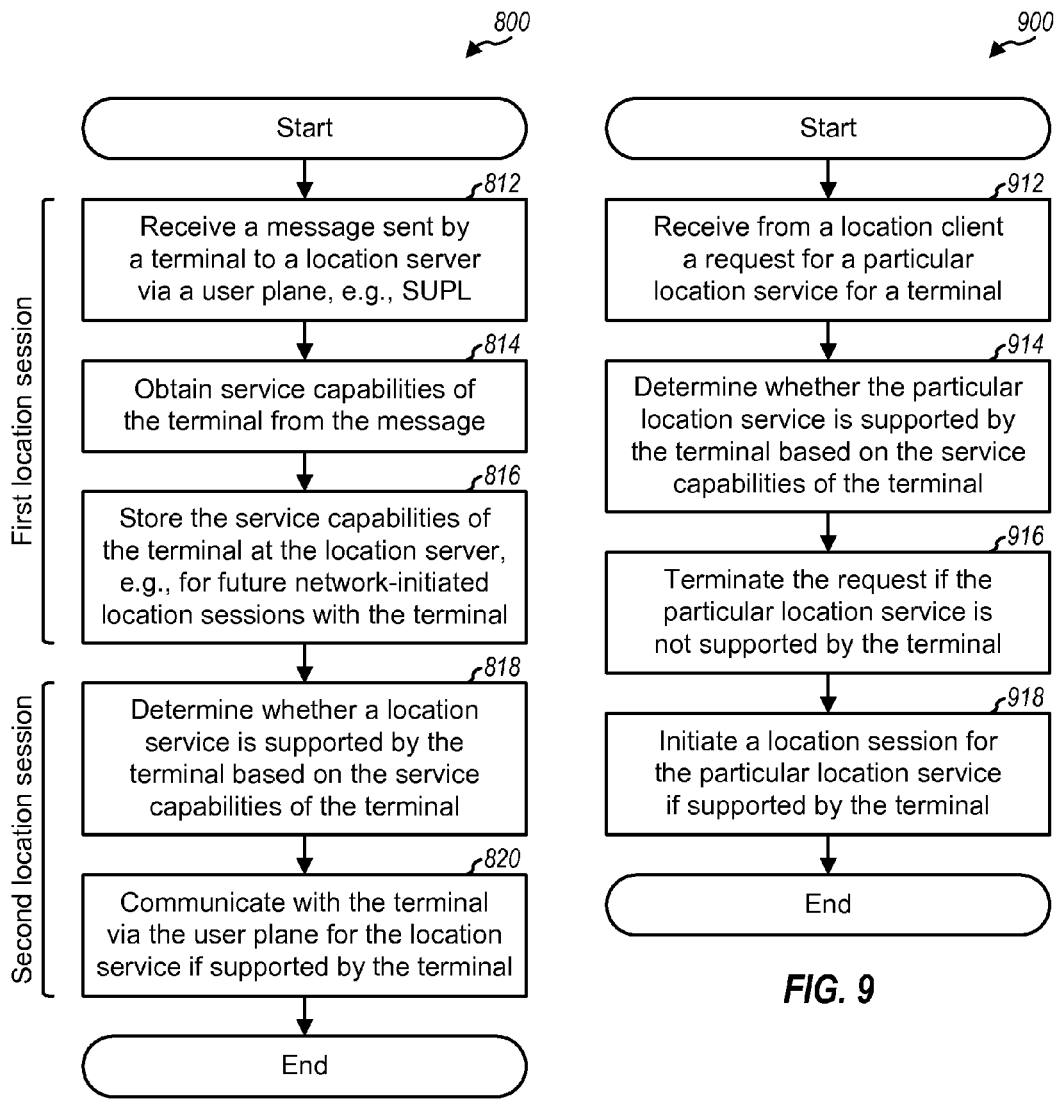

US 8,712,439 B2

METHOD AND APPARATUS FOR USING SERVICE CAPABILITY INFORMATION FOR USER PLANE LOCATION

CLAIM OF PRIORITY UNDER 35 U.S.C. §119

The present Application for Patent claims priority to Provisional U.S. Application Ser. No. 61/020,635, entitled "Service Capability Descriptor for SUPL (secure user plane location)," filed Jan. 11, 2008, assigned to the assignee hereof, and expressly incorporated herein by reference.

BACKGROUND

I. Field

The present disclosure relates generally to communication, and more specifically to techniques for supporting location services.

II. Background

It is often desirable, and sometimes necessary, to know the location of a terminal. The terms "location" and "position" are synonymous and are used interchangeably herein. For example, a user may utilize the terminal to browse through a website and may click on location sensitive content. The location of the terminal may then be determined and used to provide appropriate content to the user. As another example, the user may place an emergency call using the terminal. The location of the terminal may then be determined and used to send emergency assistance to the user. There are many other scenarios in which knowledge of the location of the terminal is useful or necessary.

A location server may exchange messages with a terminal to establish a location session for a location service. If the session establishment is successful, then the location server may communicate with the terminal for the location service. If the session establishment is unsuccessful, e.g., because the terminal does not support the location service, then the location session may be terminated. The location server may then attempt to establish a location session for another location service that might be supported by the terminal. However, each unsuccessful session establishment attempt consumes network resources and delays location service. It is thus desirable to perform session establishment as efficiently as possible in order to conserve network resources and quickly provide/obtain location service.

SUMMARY

Techniques for efficiently supporting location services in a user plane location architecture such as Secure User Plane Location (SUPL) are described herein. In an aspect, a terminal may inform a location server of service capabilities of the terminal. The location server may use the service capabilities to request only location services supported by the terminal and to avoid requesting unsupported location services.

In one design, the terminal may generate a message comprising service capabilities of the terminal and may send the message via a user plane, e.g., SUPL. The service capabilities may comprise location services supported by the terminal, reporting capabilities of the terminal for periodic triggered service, area event capabilities of the terminal for area event triggered service, session capabilities of the terminal, and/or other capabilities. The location server may receive the message from the terminal and obtain the service capabilities of the terminal. The location server may store these service capabilities for future network-initiated location sessions with the terminal.

The location server may determine whether a location service is supported by the terminal based on the service capabilities of the terminal. The location server may then communicate with the terminal via the user plane for the location service if supported by the terminal. In one design, the location server may obtain the service capabilities of the terminal in a first location session and may use the service capabilities in a second location session to determine whether the location service is supported by the terminal. In another design, the location server may obtain and use the service capabilities in the same location session.

The location server may receive from a location client a request for a particular location service for the terminal. The location server may determine whether the particular location service is supported by the terminal based on the service capabilities of the terminal. The location server may terminate the request if the particular location service is not supported by the terminal. The location server may initiate a location session for the particular location service if it is supported by the terminal.

Various aspects and features of the disclosure are described in further detail below.

BRIEF DESCRIPTION OF THE DRAWINGS

FIG. 8 shows a process performed by the location server for supporting location services.

FIG. 9 shows a process performed by the location server for network-initiated location service.

DETAILED DESCRIPTION

Techniques for supporting location services in user plane location architectures/solutions are described herein. A user plane location architecture is a location architecture that sends messages for location services via a user plane. User plane location architectures are in contrast to control plane location architectures, which send messages for location services via a control plane. A user plane is a mechanism for carrying signaling for higher-layer applications and employing a user-plane bearer, which is typically implemented with protocols such as User Datagram Protocol (UDP), Transmission Control Protocol (TCP), and Internet Protocol (IP). A control plane is a mechanism for carrying signaling for higher-layer applications and is typically implemented with network-specific protocols, interfaces and signaling messages. Messages supporting location services are carried as part of signaling in a control plane architecture and as part of data (from a network perspective) in a user plane architecture. The content of the messages may, however, be the same or similar in both user plane and control plane location architectures.

The techniques described herein may be used for various user plane location architectures such as SUPL from Open Mobile Alliance (OMA) and X.S0024 from an organization named "3rd Generation Partnership Project 2" (3GPP2). For clarity, certain aspects of the techniques are described below for SUPL, and SUPL terminology is used in much of the description below.

Figure 1:
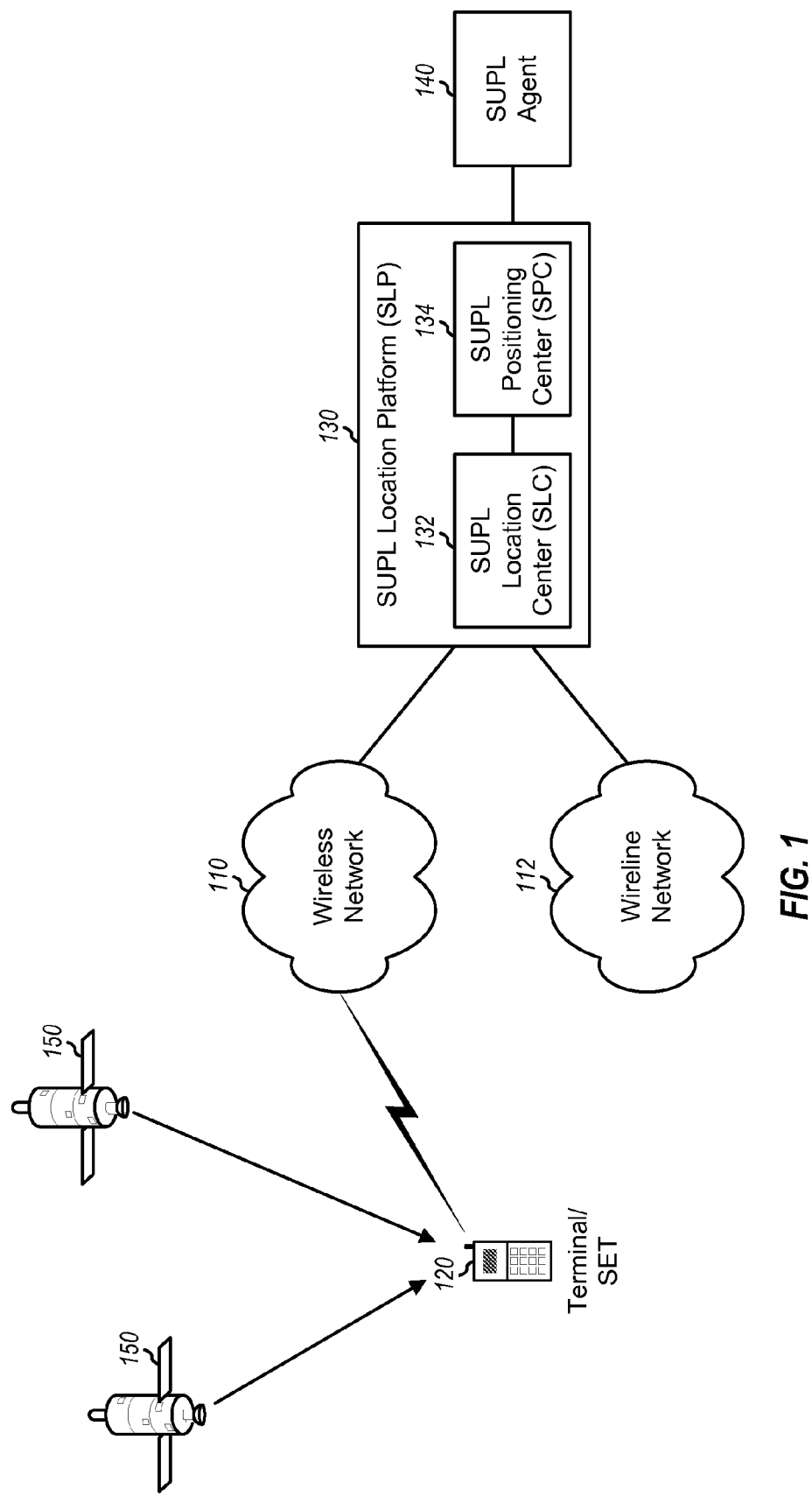
FIG. 1 shows an example deployment supporting location services.

FIG. 1 shows an example deployment supporting location services. A terminal 120 may communicate with a wireless network 110 and/or a wireline network 112 at any given moment to obtain communication services. Terminal 120 may be stationary or mobile and may also be referred to as a mobile station (MS), a user equipment (UE), a subscriber station, a station, etc. Terminal 120 may be a cellular phone, a personal digital assistant (PDA), a handheld device, a wireless device, a laptop computer, a wireless modem, a cordless phone, a telemetry device, a tracking device, etc. Terminal 120 may be referred to as a SUPL Enabled Terminal (SET) in SUPL. The terms "terminal" and "SET" are used interchangeably herein.

Wireless network 110 may be a wireless wide area network (WWAN), a wireless metropolitan area network (WMAN), a wireless local area network (WLAN), etc. The terms "network" and "system" are often used interchangeably. A WWAN may be a Code Division Multiple Access (CDMA) network, a Time Division Multiple Access (TDMA) network, a Frequency Division Multiple Access (FDMA) network, an Orthogonal FDMA (OFDMA) network, a Single-Carrier FDMA (SC-FDMA) network, etc. A CDMA network may implement a radio technology such as Wideband CDMA (WCDMA), cdma2000, etc. cdma2000 covers IS-2000, IS-95, and IS-856 standards. A TDMA network may implement a radio technology such as Global System for Mobile Communications (GSM). An OFDMA network may implement a radio technology such as Long Term Evolution (LTE), Ultra Mobile Broadband (UMB), Flash-OFDM©, etc. WCDMA, GSM and LTE are described in documents from an organization named "3rd Generation Partnership Project" (3GPP). CDMA and UMB are described in documents from 3GPP2. 3GPP and 3GPP2 documents are publicly available. A WMAN may implement a radio technology such as IEEE 802.16, which is commonly referred to as WiMAX. A WLAN may implement a radio technology such as 802.11 (which is commonly referred to as Wi-Fi), Hiperlan, etc. Wireline network 112 may be a cable network, a digital subscriber line (DSL) network, the Internet, etc.

SET 120 may receive and measure signals from satellites 150 to obtain pseudo-range measurements for the satellites. Satellites 150 may be part of the United States Global Positioning System (GPS), the European Galileo system, the Russian GLONASS system, or some other satellite positioning system (SPS) or global navigation satellite system (GNSS). The pseudo-range measurements and the known locations of satellites 150 may be used to derive a position estimate for SET 120. A position estimate may also be referred to as a location estimate, a position fix, etc. SET 120 may also receive and measure signals from base stations within wireless network 110 to obtain timing and/or signal strength measurements for the base stations. A base station may also be referred to as a base transceiver station (BTS), a Node B, an evolved Node B (eNB), an access point, etc. The timing and/or signal strength measurements and the known locations of the base stations may be used to derive a position estimate for SET 120. In general, a position estimate may be derived based on measurements for satellites and/or base stations and using one or a combination of positioning methods.

A SUPL Location Platform (SLP) 130 may communicate with SET 120 to support location services for the SET. Location services may include any services based on or related to location information. Location services may include positioning, which is a process to determine a geographic or civil position estimate for a SET. Positioning may provide latitude, longitude and altitude coordinates and an uncertainty for a geographic position estimate or a street address for a civil position estimate. The communication between SLP 130 and SET 120 may be via wireless network 110 and/or wireline network 112. SLP 130 may be separate from networks 110 and 112 or may be part of network 110 or 112. SLP 130 may be a Home SLP (H-SLP) with which SET 120 has a service subscription, a Visited SLP (V-SLP) currently serving SET 120, or an Emergency SLP (E-SLP) serving SET 120 for emergency services.

SLP 130 may include a SUPL Location Center (SLC) 132 and a SUPL Positioning Center (SPC) 134. SLC 132 may perform various functions for location services, coordinate the operation of SUPL, and interact with SETs over user plane bearer. SLC 132 may perform functions for privacy, initiation, security, roaming support, charging/billing, service management, location calculation, etc. SPC 134 may support positioning for SETs and delivery of assistance data to the SETs and may also be responsible for messages and procedures used for location calculation. SPC 134 may perform functions for security, assistance data delivery, reference retrieval, location calculation, etc.

A SUPL agent 140 may communicate with SLP 130 to obtain location information for SET 120. A SUPL agent is a service access point or a location client that accesses network resources to obtain location information. Location information may comprise a position estimate and/or any information related to location. SET 120 may also have a SUPL agent that is resident within the SET. SET 120, SLP 130, and SUPL agent 140 may each support any SUPL version. SUPL Version 2.0 (SUPL 2.0) is described in OMA-AD-SUPL-V2, entitled "Secure User Plane Location Architecture," and OMA-TS-ULP-V2, entitled "UserPlane Location Protocol." These SUPL documents are publicly available from OMA.

SET 120 may support one or more positioning methods or measurements for one or more positioning methods. The measurements may be used to determine the location of the SET. For example, SET 120 may support autonomous GPS, assisted GPS (A-GPS), Advanced Forward Link Trilateration (A-FLT), Enhanced Observed Time Difference (E-OTD), Observed Time Difference Of Arrival (OTDOA), Enhanced Cell ID, Cell ID, etc. Autonomous GPS and assisted GPS are positioning methods based on measurements for satellites, and the term "GPS" generically refers to any satellite positioning system. AFLT, E-OTD, and OTDOA are positioning methods based on timing measurements for base stations in a wireless network.

SET 120 may also support one or more location services. Table 1 lists some location services that may be supported by SET 120 and provides a short description of each location service. Emergency service may be based on immediate service or some other location service. SET 120 may also support other location services not listed in Table 1.

TABLE 1

| Location Service | Description |
| --- | --- |
| Immediate | Location of a SET is immediately determined and provided to a SUPL agent. |
| Periodic trigger | Location of a SET is periodically determined and provided to a SUPL agent. |
| Area event trigger | Location of a SET is determined and provided to a SUPL agent whenever triggered by an area event, e.g., whenever the current location of the SET is within a target area or enters or leaves the target area. |

In SUPL 2.0, an SLP generally does not have knowledge of the service capabilities of a SET. The service capabilities may include location services supported by the SET and other capabilities of the SET, as described below. As a result, when a location service is invoked (e.g., in response to a request from a SUPL agent), the SLP may not know whether this location service is supported by the SET. If the SLP requests the location service and it is not supported by the SET, then the SLP and the SET may engage in an exchange of messages that ultimately results in termination of a location session. Valuable network resources may be wasted by invoking and then aborting the location session for the unsupported location service.

The SLP may generate and maintain a table of service capabilities of the SET. The SLP may determine the location services supported by the SET in a trial and error manner by invoking all possible location services. The SLP may also wait until each location service is requested by a SUPL agent and may exclude from the table all location services that resulted in terminated location sessions. In any case, the SLP may generate the table of service capabilities by requesting different location services from the SET. Once the SLP has generated the complete table, the SLP can use the table to quickly reject requests for location services not supported by the SET without wasting network resources. However, building the table of service capabilities based on results of location sessions may consume too much network resources, may take too long to complete, and/or may be prone to error. For example, the table may become invalid if the service capabilities of the SET change.

The SLP may transform a request for a location service that the SET does not support into one or more requests for a location service that the SET supports. For example, the SLP may transform a request for periodic triggered service into a sequence of requests for immediate service and may determine when to send each request for immediate service. However, such transformation of a location service request may increase complexity of the SLP and may be applicable for only some cases.

In an aspect, SET 120 may directly inform SLP 130 of the service capabilities of the SET. SLP 130 may use the SET service capabilities to request only location services supported by SET 120 and to avoid requesting unsupported location services.

Figure 2:
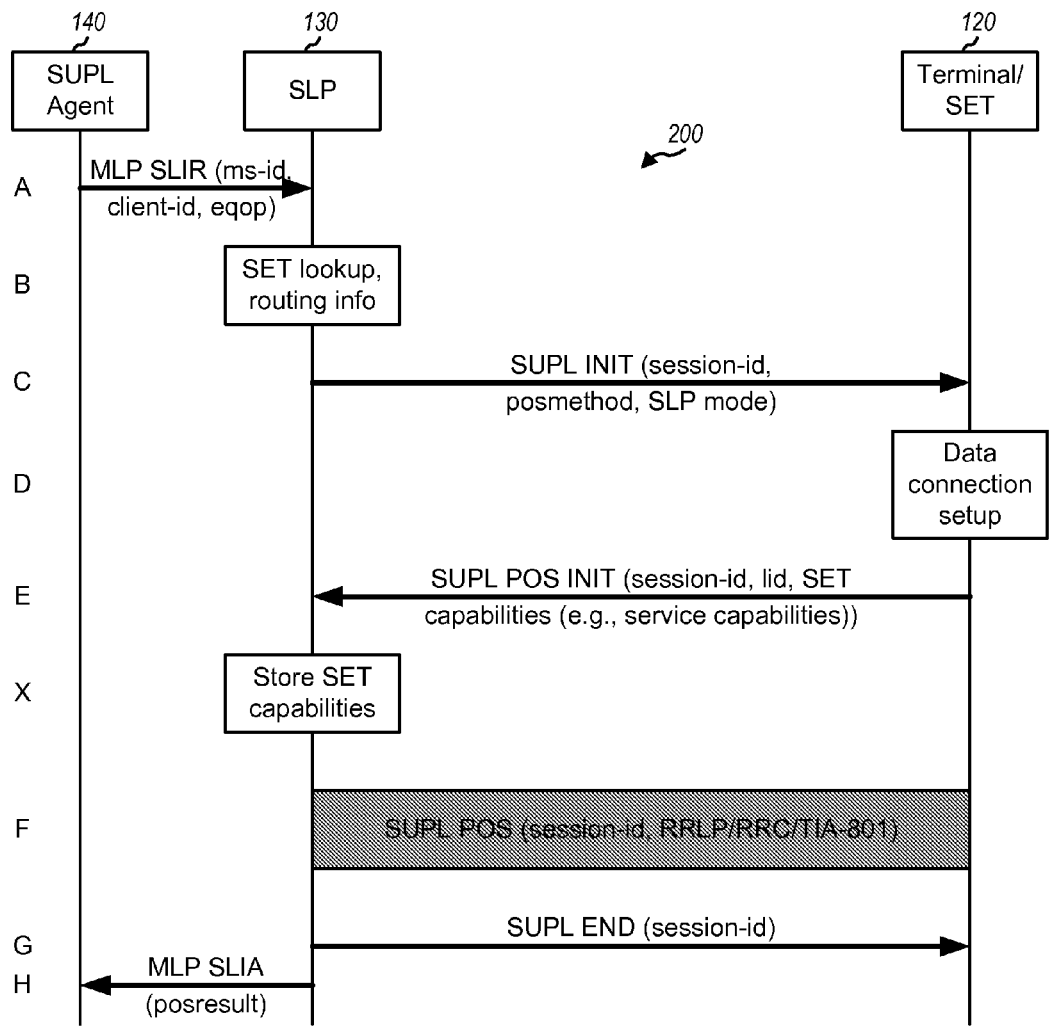
FIG. 2 shows a call flow for network-initiated immediate service.

FIG. 2 shows a design of a call flow 200 for network-initiated immediate service. SUPL agent 140 may desire location information for SET 120 and may send a Mobile Location Protocol (MLP) Standard Location Immediate Request (SLIR) message to SLP 130 (step A). SLP 130 may authenticate and authorize SUPL agent 140 for the requested location information. SLP 130 may then obtain routing information for SET 120 (step B).

SLP 130 may send a SUPL INIT message to initiate a location session with SET 120 (step C). A location session may also be referred to as a SUPL session. The SUPL INIT message may include a session-id used to identify the location session, an intended positioning method (posmethod), the desired quality of positioning (QoP), an SLP mode indicating whether the SLP is using proxy or non-proxy mode, etc. SET 120 may communicate directly with SPC 134 in the non-proxy mode (not shown in FIG. 2) or indirectly with SPC 134 via SLC 132 in the proxy mode (as shown in FIG. 2).

Upon receiving the SUPL INIT message, SET 120 may perform a data connection setup procedure, attach itself to a packet data network if the SET is not already attached, and establish a secure IP connection to SLP 130 (step D). SET 120 may then send a SUPL POS INIT message to SLP 130 to start a positioning session (step E). The SUPL POS INIT message may include the session-id, a location-id (lid) identifying the current serving cell of the SET, the SET capabilities, etc. The SET capabilities may include positioning capabilities and/or service capabilities of the SET. The positioning capabilities may include the supported positioning methods (e.g., SET-assisted A-GPS, SET-based A-GPS, etc.) and the associated positioning protocols (e.g., RRLP, RRC, TIA-801). The service capabilities may include supported location services (e.g., any of the location services listed in Table 1), reporting capabilities, and/or other capabilities, as described below. SLP 130 may store the SET capabilities including the service capabilities for future use (step X).

If a position estimate for SET 120 is needed, then SLP 130 and SET 120 may exchange messages for the positioning session (step F). For SET-assisted positioning, SLP 130 may calculate a position estimate for SET 120 based on measurements received from the SET. For SET-based positioning, SET 120 may calculate the position estimate based on assistance from SLP 130. In any case, upon completing the positioning session, SLP 130 may send a SUPL END message to SET 120 (step G).

SLP 130 may also send the requested location information in an MLP Standard Location Immediate Answer (SLIA) message to SUPL agent 140 (step H).

Figure 3:
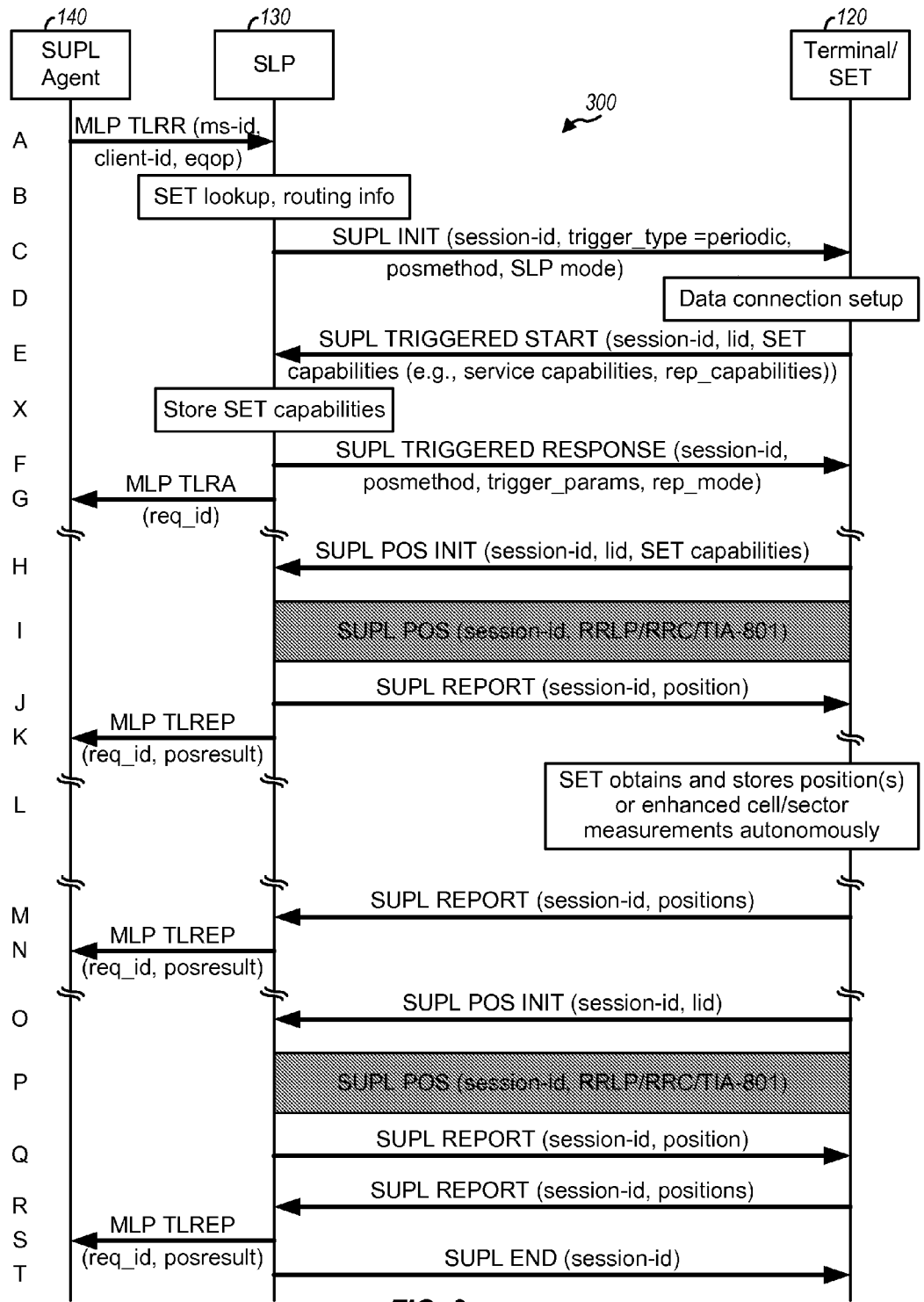
FIG. 3 shows a call flow for network-initiated periodic triggered service.

FIG. 3 shows a design of a call flow 300 for network-initiated periodic triggered service. SUPL agent 140 may send an MLP Triggered Location Reporting Request (TLRR) message to SLP 130 to request location information for SET 120 (step A). The MLP TLRR message may indicate a reporting mode (e.g., batch reporting, quasi-real time reporting, or real time reporting) and may also include conditions for sending batch reports. SLP 130 may authenticate and authorize SUPL agent 140 for the requested location information and may obtain routing information for SET 120 (step B). SLP 130 may send a SUPL INIT message to initiate a periodic triggered session with SET 120 (step C). The SUPL INIT message may include a session-id, a trigger type indicator that indicates periodic trigger, an intended positioning method, the SLP mode, etc.

SET 120 may receive the SUPL INIT message, perform a data connection setup procedure, attach itself to a packet data network, and establish a secure IP connection to SLP 130 (step D). SET 120 may then send a SUPL TRIGGERED START message to SLP 130 to start a positioning session (step E). The SUPL TRIGGERED START message may include the session-id, the location-id, the SET capabilities, etc. The SET capabilities may include positioning capabilities, service capabilities, reporting capabilities, etc. The reporting capabilities may indicate whether SET 120 is capable of batch reporting, quasi-real time reporting, or real time reporting. SLP 130 may store the SET capabilities including the service capabilities for future use (step X).

SLP 130 may select a positioning method for the periodic triggered session and may send a SUPL TRIGGERED RESPONSE message to SET 120 (step F). The SUPL TRIGGERED RESPONSE message may include the session-id, the selected positioning method, the periodic trigger parameters, the reporting mode, etc. SLP 130 may also send an MLP Triggered Location Reporting Answer (TLRA) message to SUPL agent 140 to indicate that the triggered location request has been accepted (step G). The MLP TLRA message may include a request-id (req-id) to be used as a transaction id for the entire periodic triggered session.

When a periodic trigger in SET 120 indicates that a position fix is needed, SET 120 may attach itself to the packet data network if needed. SET 120 may then send a SUPL POS INIT message to start a positioning session with SLP 130 (step H). The SUPL POS INIT message may include the session-id, the location-id, the SET capabilities, etc. If a position estimate for SET 120 is needed, then SLP 130 and SET 120 may exchange messages for the positioning session (step I). Upon completing the positioning session, SLP 130 may send a SUPL REPORT message containing the session-id and the position estimate to SET 120 (step J). SLP 130 may also send the position estimate in an MLP Triggered Location Report (TL-REP) message to SUPL agent 140 (step K).

SET 120 may autonomously determine its position (step L) and may send a position estimate in a SUPL REPORT message to SLP 130 (step M). SLP 130 may send the position estimate in an MLP TLREP message to SUPL agent 140 (step N).

Steps H to N may be repeated as applicable. Steps O to Q may be performed for a positioning session for the last position estimate and may be a repeat of steps H to J. SET 120 may send a SUPL REPORT message containing all or a subset of the position estimates stored at the SET to SLP 130 (step R). SLP 130 may send to SUPL agent 140 an MLP TLREP message containing the position estimates reported by SET 120 and/or calculated by the SLP (step S). After reporting the last position result to SUPL agent 140, SLP 130 may send a SUPL END message to SET 120 to indicate the end of the periodic triggered session (step T).

Figure 4:
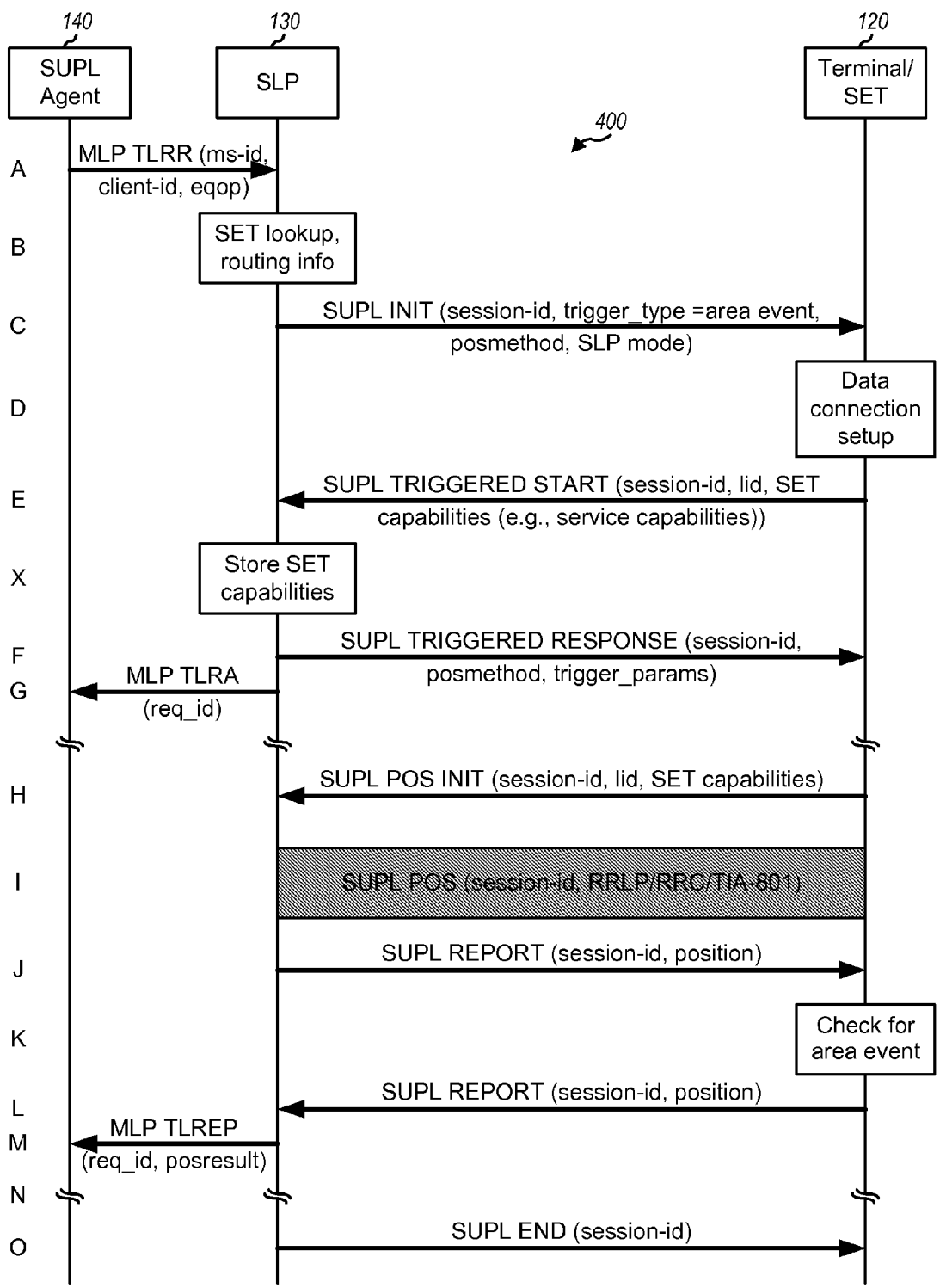
FIG. 4 shows a call flow for network-initiated area event triggered service.

FIG. 4 shows a design of a call flow 400 for network-initiated area event triggered service. SUPL agent 140 may send an MLP TLRR message to SLP 130 to request location reports for SET 120 (step A). SLP 130 may authenticate and authorize SUPL agent 140 for the requested location information and may obtain routing information for SET 120 (step B). SLP 130 may send a SUPL INIT message with a session-id, a trigger type indicator that indicates area event trigger, etc. (step C). SET 120 may perform a data connection setup procedure, attach itself to a packet data network, and establish a secure IP connection to SLP 130 (step D). SET 120 may then send a SUPL TRIGGERED START message to start an area event triggered session (step E). The SUPL TRIGGERED START message may include the session-id, the location-id, the SET capabilities (e.g., service capabilities), etc. SLP 130 may store the SET capabilities including the service capabilities for future use (step X). SLP 130 may send a SUPL TRIGGERED RESPONSE message with area event trigger parameters (step F). SLP 130 may also send an MLP TLRA message to SUPL agent 140 (step G).

Whenever an area event trigger indicates that a position fix is to be executed, SET 120 may send a SUPL POS INIT message to start a positioning session with SLP 130 (step H). The SUPL POS INIT message may include the session-id, the SET capabilities (e.g., positioning capabilities and service capabilities), etc. SLP 130 and SET 120 may exchange messages for the positioning session (step I), and SLP 130 may send a SUPL REPORT message containing a position estimate to SET 120 (step J). SET 120 may then check the position estimate to determine whether an event trigger condition has been meet (step K). If a condition has been meet, then SET 120 may send a SUPL REPORT message containing the position estimate to SLP 130 (step L). SLP 130 may then forward the position estimate in an MLP TLREP message to SUPL agent 140 (step M).

Steps H to M may be repeated as applicable (step N). When the last report has been sent, SLP 130 may send a SUPL END message to SET 120 to end the area event triggered session (step O).

For a network-initiated service, SET 120 may send its service capabilities in a SUPL message to SLP 130. This SUPL message may be a SUPL POS INIT message in FIG. 2 or a SUPL TRIGGERED START message in FIGS. 3 and 4. SLP 130 may use the service capabilities of SET 120 to determine whether or not to request a particular location service and to avoid requesting a location service not supported by the SET.

Figure 5:
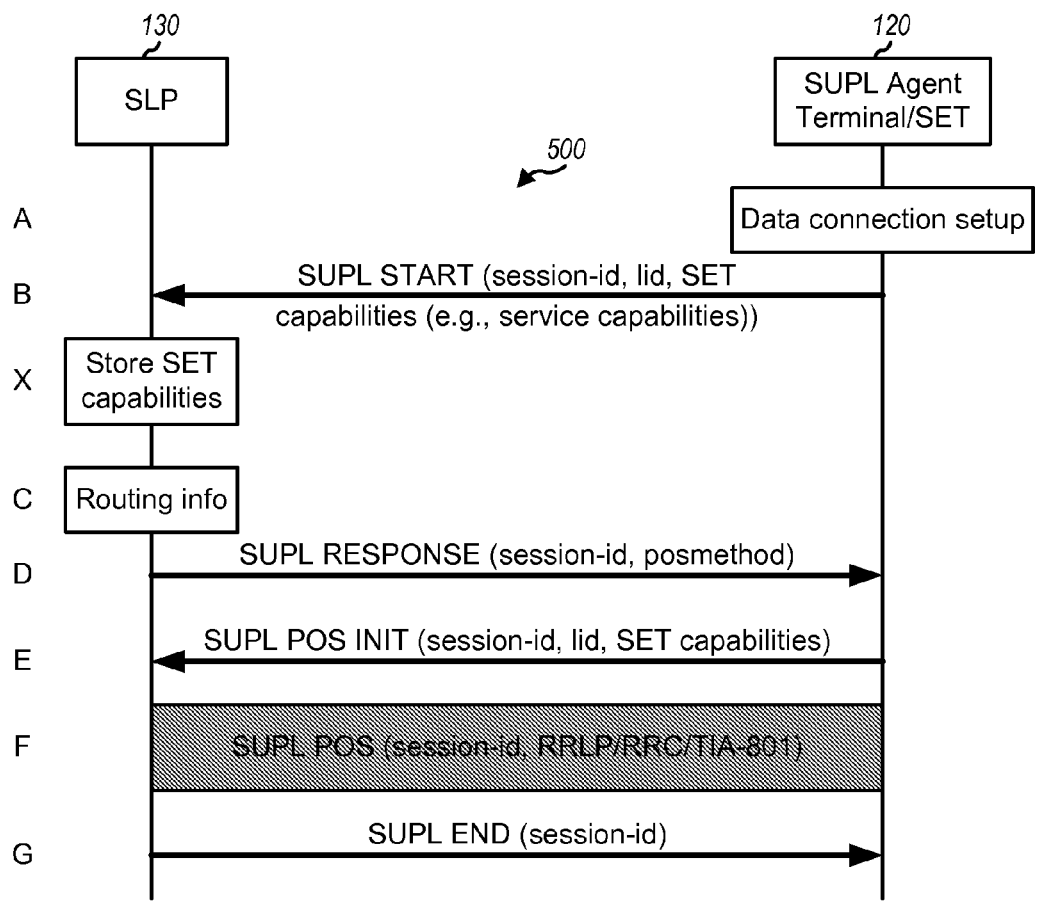
FIG. 5 shows a call flow for terminal-initiated immediate service.

FIG. 5 shows a design of a call flow 500 for SET-initiated immediate service. A SUPL agent on SET 120 may receive a request for location information from an application running on the SET. SET 120 may perform a data connection setup procedure, attach itself to a packet data network if necessary, and establish a secure IP connection to SLP 130 (step A). SET 120 may then send a SUPL START message to initiate a location session with SLP 130 (step B). The SUPL START message may include a session-id, the SET capabilities (e.g., positioning capabilities and service capabilities), etc. SLP 130 may receive the SUPL START message and may extract and store the SET capabilities including the service capabilities for future use (step X). SLP 130 may determine that SET 120 is currently not roaming for SUPL (step C). SLP 130 may then send to SET 120 a SUPL RESPONSE message that may include the session-id, a selected positioning method, etc. (step D).

SET 120 may then send to SLP 130 a SUPL POS INIT message that may include the session-id, the SET capabilities, etc. (step E). SLP 130 and SET 120 may then exchange messages for a positioning session (step F). Upon completing the positioning session, SLP 130 may send a SUPL END message with the requested location information to SET 120 (step G).

Call flows for SET-initiated periodic triggered service and SET-initiated area event triggered service in SUPL are described in the aforementioned OMA-AD-SUPL-V2 and OMA-TS-ULP-V2 documents. For each of these call flows, SET 120 may send a SUPL TRIGGERED START message to start a periodic triggered session or an area event triggered session. The SUPL TRIGGERED START message may include the SET capabilities.

For a SET-initiated service, SET 120 may send its service capabilities in a SUPL message, which may be a SUPL START message or a SUPL TRIGGERED START message. In one design, SLP 130 may store the service capabilities of SET 120 for use later to determine whether a particular location service can be requested for the SET. In another design, SLP 130 may use the service capabilities of SET 120 for the current SET-initiated location session. For example, SET 120 may request a location service not supported by SLP 130 or not authorized for SET 120. SLP 130 may then reply with one or more location services supported by both SET 120 and SLP 130 and also allowed for SET 130. The service capabilities sent by SET 120 may also be used in other manners for the current location session or a later location session.

SET 120 may also send its capabilities to SLP 130 to provide the SLP with this information and/or whenever there is a change in the SET capabilities. The change in the SET capabilities may occur due to a change in service subscription, a change in identity module, etc.

Figure 6:
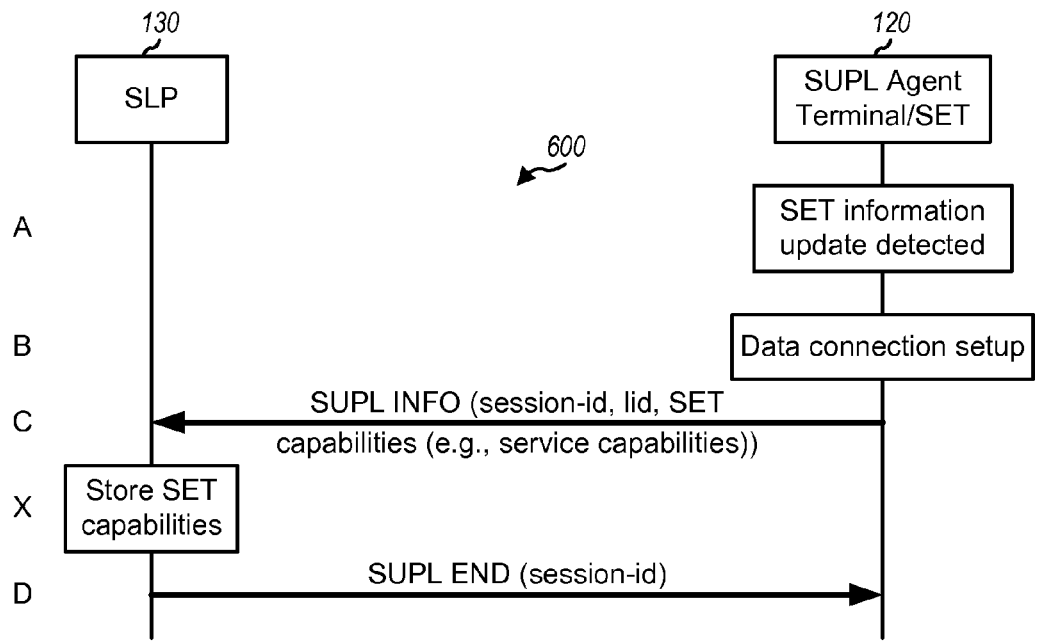
FIG. 6 shows a call flow for sending service capabilities of a terminal to a location server.

FIG. 6 shows a design of a call flow 600 for sending the capabilities of SET 120 to SLP 130. SET 120 may detect an update or change in the SET capabilities (step A). SET 120 may perform a data connection setup procedure, attach itself to a packet data network if necessary, and establish a secure IP connection to SLP 130 (step B). SET 120 may then send a SUPL INFO message to SLP 130 (step C). The SUPL INFO message may include a session id, the SET capabilities (e.g., updated service capabilities), etc. SLP 130 may receive the SUPL INFO message, obtain the SET capabilities, and store the SET capabilities in a table for SET 120 (step X). SLP 130 may then send a SUPL END message to SET 120 to end the location session (step D).

In general, SET 120 may send its capabilities in any message to SLP 130. In one design, SET 120 may send its capabilities in any of the SUPL messages shown in Table 2. SET 120 may also send its capabilities in other SUPL messages. The formats of various SUPL messages are described in the aforementioned OMA-TS-ULP-V2 document.

TABLE 2

| SUPL Message | Description |
| --- | --- |
| SUPL START | Sent by the SET to the SLP for SET-initiated immediate service. |
| SUPL TRIGGERED START | Sent by the SET to the SLP to start a periodic triggered service or an area event triggered service for both network-initiated and SET-initiated location sessions. |
| SUPL POS INIT | Sent by the SET to the SLP to start a positioning session. |
| SUPL END | Sent by the SLP to the SET to end a location session or by the SET to terminate a network-initiated session for a location service not supported by the SET. |
| SUPL AUTH REQ | Sent by the SET to the SLP to request information for mutual authentication of the SET and the SLP. |
| SUPL INFO | Sent by the SET to the SLP to update the SET capabilities. |

In one design, the service capabilities of SET 120 may include any of the capabilities listed in Table 3. The service capabilities may also include other capabilities of SET 120.

TABLE 3

Service Capabilities

| Capability | Description |
| --- | --- |
| Supported services | Indicate location services supported by the SET. |
| Reporting capabilities | Indicate reporting capabilities of the SET for periodic triggered service, e.g., supported reporting mode and parameters. |
| Area event capabilities | Indicate capabilities of the SET for area event triggered service, e.g., number of target areas, area id lists, etc. |
| Session capabilities | Indicate session capabilities of the SET, e.g., number of simultaneous location sessions supported by the SET. |

Figure 7:
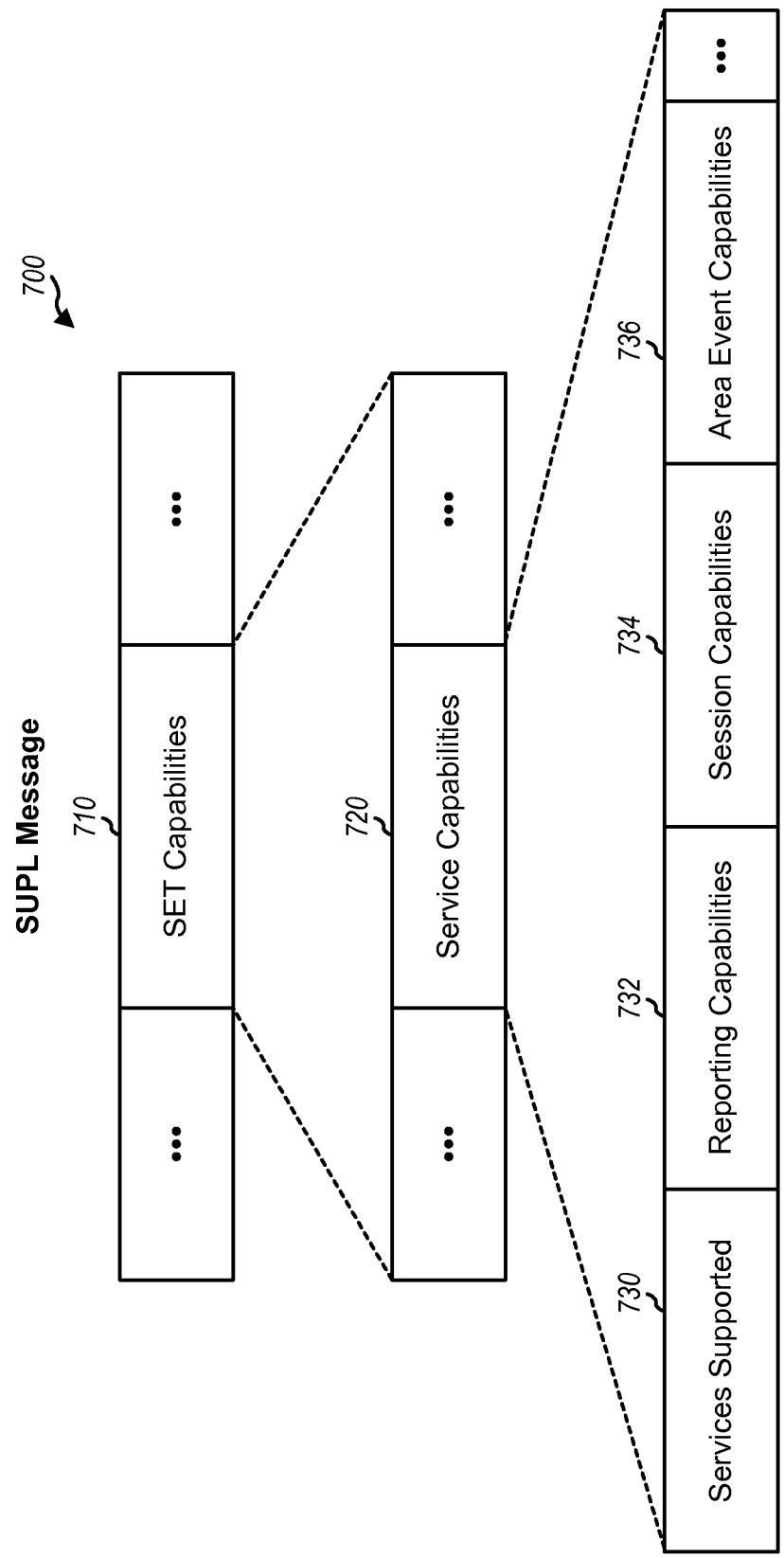
FIG. 7 shows a SUPL message for sending service capabilities of the terminal.

FIG. 7 shows a design of a SUPL message 700 for sending service capabilities of SET 120. SUPL message 700 may be one of the SUPL messages listed in Table 2 or some other SUPL message. In this design, SUPL message 700 includes a SET Capabilities parameter 710 and possibly other parameters not shown in FIG. 7 for simplicity. SET Capabilities parameter 710 may include a Service Capabilities subparameter 720 and possibly other subparameters for supported positioning methods, supported positioning protocols, etc. Service Capabilities subparameter 720 may include a field 730 for supported services, a field 732 for reporting capabilities, a field 734 for session capabilities, and a field 736 for area event capabilities. Service Capabilities subparameter 720 may include different and/or additional fields for other capabilities.

In the design shown in FIG. 7, SET 120 may send its service capabilities in a "Service Capabilities" subparameter, which may be optionally included in a "SET Capability" parameter, which may in turn be included in any of the SUPL messages shown in Table 2 or some other SUPL message. In another design, SET 120 may send its service capabilities in a "SET Service Capability" parameter, which may be optionally included in any of the SUPL messages shown in Table 2 or some other SUPL message.

Table 4 shows a design of the "SET Capability" parameter, which includes the "Service Capabilities" subparameter. In the "Parameter" column of Table 4, ">" denotes a subparameter of the "SET Capability" parameter, ">>" denotes a field of the subparameter, and a ">>>" denotes a subfield of the field. In the "Presence" column of Table 4, an "M" indicates a mandatory parameter, an "O" indicates an optional parameter, and a "CV" indicates a parameter that is conditional on value. For simplicity, only fields of the "Service Capabilities" subparameter are shown in Table 4. The "SET Capability" parameter may include other subparameters described in the aforementioned OMA-TS-ULP-V2 document, e.g., subparameters for positioning capabilities.

TABLE 4

SET Capabilities parameter

| Parameter | Presence | Value/Description |
| --- | --- | --- |
| SET capabilities | — | SET capabilities (not mutually exclusive) in terms of supported positioning technologies and positioning protocols. During a particular SUPL session, a SET may send its capabilities more than once —specifically, in SET initiated cases, the SET capabilities are sent in SUPL START, SUPL TRIGGERED START and SUPL POS INIT. For immediate requests, the SET capabilities MUST NOT change during this particular session. For triggered requests, the SET capabilities MAY change during a session. The SET Capabilities parameter MAY also be used by the SET to inform the H-SLP about its service capabilities. |
| >Service Capabilities | O | The service capabilities of the SET are described in this parameter. The SET MAY send this parameter in SUPL START, SUPL POS INIT, SUPL TRIGGERED START, SUPL AUTH REQ and SUPL END. The purpose of this parameter is to inform the H-SLP about the service capabilities of the SET |
| >>services supported | M | Defines the supported services by the SET. Only Network Initiated services are relevant in this context. Zero or more of the following services are supported: Periodic Trigger Area Event Trigger |

TABLE 4-continued

SET Capabilities parameter

| Parameter | Presence | Value/Description |
|---|---|---|
| >>reporting capabilities | CV | Defines the reporting capabilities of the SET. This parameter is only required if periodic triggers are supported by the SET in which case the parameter is mandatory. |
| >>>rep mode | M | Supported reporting mode(s):<br>Real time<br>Quasi real time<br>Batch reporting<br>(At least one of the three reporting modes must be supported) |
| >>>batch rep type | M | Defines the type of batch reporting supported by the SET (only applicable to quasi real time and batch reporting):<br>Report position (true if reporting of position is allowed, false otherwise)<br>Report measurements (true if reporting of measurements is supported, false otherwise)<br>Historic measurements (true if reporting of measurements is supported, false otherwise) |
| >>>batch rep params | M | Maximum number of positions/measurements (range: 1 to 2048)<br>Maximum number of historical measurements (range: 1 to 64) |
| >>session capabilities | M | Defines the session capabilities of the SET:<br>Total number of simultaneous sessions.<br>Maximum number of simultaneous periodic triggered sessions (only used for periodic triggers).<br>Maximum number of simultaneous area event triggered sessions (only used for area event triggers). |
| >>area event capabilities | CV | Defines the area event capabilities of the SET. This parameter is only required if area event triggers are supported by the SET in which case the parameter is mandatory. |
| >>>max number of geographical target areas | O | This parameter defines the maximum number of geographic target areas the SET supports. (range: 1 to 32)<br>This parameter is optional. If not present, the SET does not support geographical target areas. |
| >>>max number of Area Id Lists | O | This parameter defines the maximum number of Area Id Lists the SET supports. (range: 1 to 32)<br>This parameter is optional. If not present, the SET does not support Area Ids. |
| >>>max number of Area Ids per Area Id List | CV | This parameter defines the maximum number of Area Ids per Area Id List the SET supports. (range: 1 to 256)<br>This parameter is conditional: if max number of Area Id Lists is present, then this parameter MUST be present. Otherwise this parameter MUST NOT be present. |

Table 4 shows a specific design of information that may be sent for the service capabilities of SET 120. The information given in Table 4 may also be defined or applied in different manners than described in Table 4. For example, the supported location services may be applicable for both network-initiated services as well as SET-initiated services. Different and/or additional information may also be sent for the service capabilities.

For clarity, the techniques for supporting location services have been specifically described for SUPL. The techniques may also be used for other user plane location architectures/solutions. SET 120 and SLP 130 may be referred to by different terminology in other location architectures. For example, SLP 130 may also be referred to as a location server, a location services (LCS) server, a location center, a position server, etc.

FIG. 8 shows a design of a process 800 performed by a location server (e.g., an SLP) to support location services. The location server may receive a message sent by a terminal to the location server via a user plane, e.g., SUPL (block 812). This message may be one of the SUPL messages shown in Table 2 or some other message. The location server may obtain service capabilities of the terminal from the message (block 814). The service capabilities of the terminal may comprise location services supported by the terminal and may indicate whether the terminal supports periodic triggered service, area event triggered service, etc. The service capabilities of the terminal may also comprise reporting capabilities of the terminal for periodic triggered service, area event capabilities of the terminal for area event triggered service, session capabilities of the terminal for the number of simultaneous location sessions supported by the terminal, and/or other capabilities, e.g., as shown in FIG. 7 and Table 4. The location server may store the service capabilities of the terminal, e.g., for future network-initiated location sessions with the terminal (block 816).

The location server may determine whether a location service is supported by the terminal based on the service capabilities of the terminal (block 818). The location server may then communicate with the terminal via the user plane for the location service if supported by the terminal (block 820). In one design, which is shown in FIG. 8, the location server may receive the message, obtain the service capabilities of the terminal, and store the service capabilities in a first location session. The location server may determine whether the location service is supported by the terminal and communicate with the terminal in a second location session after the first location session. In this design, blocks 812, 814 and 816 may be for one location session, and blocks 818 and 820 may be for another location session, as shown in FIG. 8. In another design, the location server may obtain the service capabilities at the start of a location session and may use the service capabilities to determine whether the location service is supported by the terminal in the same location session. In this design, blocks 812 to 820 may be for a single location session.

FIG. 9 shows a design of a process 900 performed by a location server (e.g., an SLP) for network-initiated location services. The location server may receive from a location client (e.g., a SUPL agent) a request for a particular location service for a terminal (block 912). The particular location service may be for a periodic triggered service, an area event triggered service, etc. The location server may determine whether the particular location service is supported by the terminal based on the service capabilities of the terminal (block 914). The location server may terminate the request if the particular location service is not supported by the terminal (block 916). The location server may initiate a location session for the particular location service if it is supported by the terminal (block 918).

Figure 10:
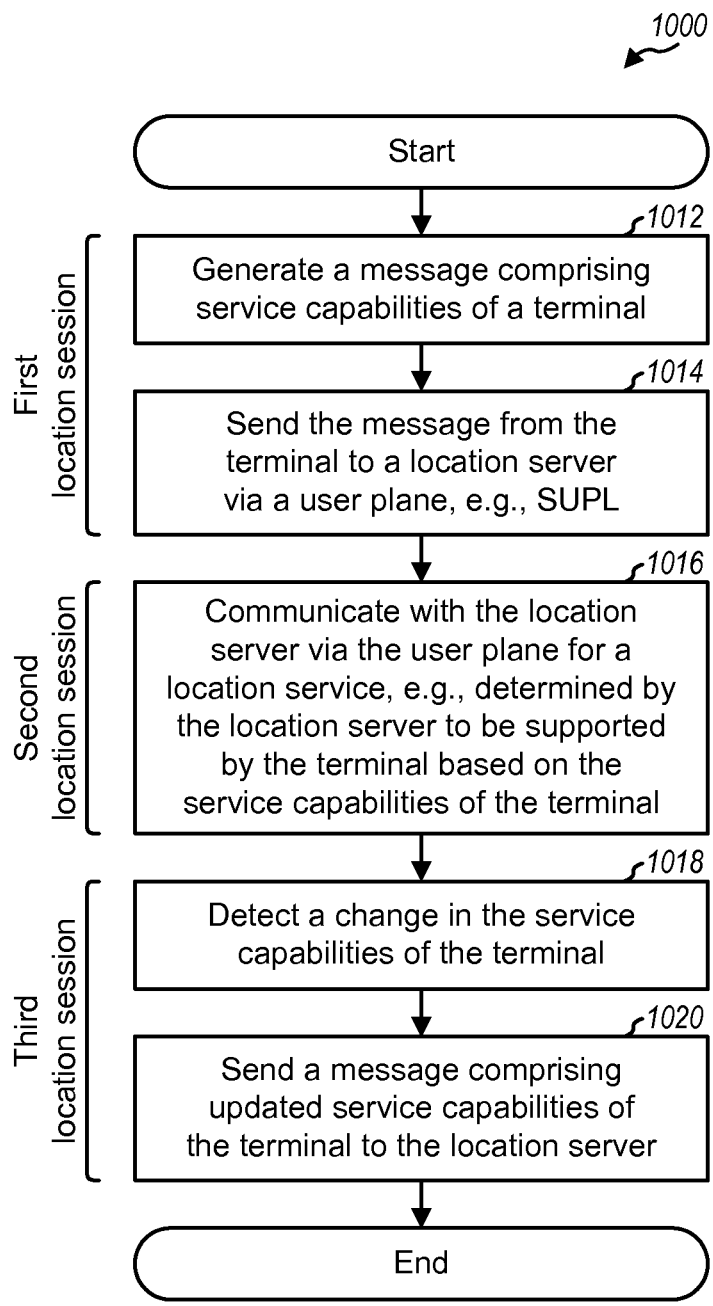
FIG. 10 shows a process performed by the terminal.

FIG. 10 shows a design of a process 1000 performed by a terminal (e.g., a SET) to support or obtain location services. The terminal may generate a message comprising service capabilities of the terminal (block 1012). This message may be one of the SUPL messages shown in Table 2 or some other message. The service capabilities of the terminal may comprise any of the capabilities shown in Table 4 and/or other capabilities. The terminal may send the message to a location server via a user plane, e.g., via SUPL (block 1014). The terminal may communicate with the location server via the user plane for a location service, e.g., determined by the location server to be supported by the terminal based on the service capabilities of the terminal (block 1016).

In one design, which is shown in FIG. 10, the terminal may generate and send the message in a first location session. The terminal may communicate with the location server for the location service in a second location session after the first location session. In this design, blocks 1012 and 1014 may be for one location session, and block 1016 may be for another location session, as shown in FIG. 10. In another design, the terminal may send the message at the start of a location session, and the location service for the same location session may be determined by the location server based on the service capabilities of the terminal. In this design, blocks 1012 to 1016 may be for a single location session. In general, the terminal may send a message comprising its service capabilities at the start of a location session, during the location session, or at the end of the session. For example, the terminal may send its service capabilities in the first message sent by the terminal for a location session. As another example, the terminal may send a message to terminate a location session initiated by the location server for a location service not supported by the terminal. This message may include the service capabilities of the terminal, which may be used by the location server to subsequently request a location service supported by the terminal.

The terminal may detect a change in its service capabilities (block 1018). The terminal may send a message comprising updated service capabilities to the location server (block 1020). Blocks 1018 and 1020 may be for a location session that may be separate from the location session(s) for blocks 1012 to 1016, as shown in FIG. 10.

Figure 11:
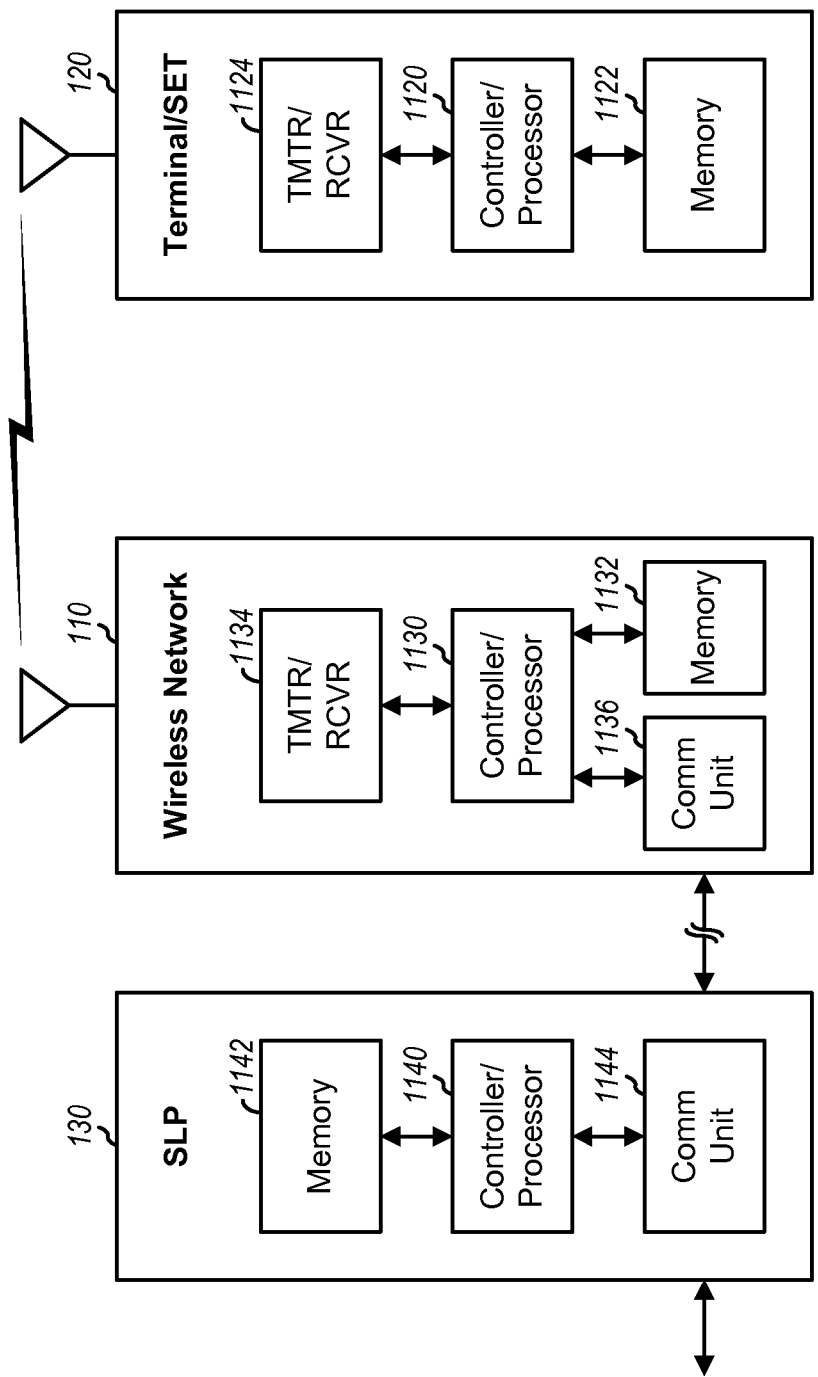
FIG. 11 shows a block diagram of a wireless network, the terminal, and the location server.

FIG. 11 shows a block diagram of a design of wireless network 110, terminal/SET 120, and location server/SLP 130 in FIG. 1. For simplicity, FIG. 11 shows only one controller/processor 1120, one memory 1122, and one transmitter/receiver (TMTR/RCVR) 1124 for terminal 120, only one controller/processor 1130, one memory 1132, one transmitter/receiver 1134, and one communication (Comm) unit 1136 for wireless network 110, and only one controller/processor 1140, one memory 1142, and one communication unit 1144 for SLP 130. In general, each entity may include any number of processors, controllers, memories, transmitters/receivers, communication units, etc. Terminal 120 may support communication with one or more wireless and/or wireline networks. Terminal 120 may also receive and process signals from one or more satellite positioning systems, e.g., GPS, Galileo, etc.

On the downlink, wireless network 110 may transmit traffic data, signaling, and pilot to terminals within its coverage area. These various types of information may be processed by processor 1130, conditioned by transmitter 1134, and transmitted on the downlink. At terminal 120, downlink signals from wireless network 110 may be received and conditioned by receiver 1124 and further processed by processor 1120 to obtain various types of information. Processor 1120 may perform process 1000 in FIG. 10 and/or other processes for the techniques described herein. Memories 1122 and 1132 may store program codes and data for terminal 120 and wireless network 110, respectively.

On the uplink, terminal 120 may transmit traffic data, signaling, and pilot to wireless network 110. These various types of information may be processed by processor 1120, conditioned by transmitter 1124, and transmitted on the uplink. At wireless network 110, the uplink signals from terminal 120 and other terminals may be received and conditioned by receiver 1134 and further processed by processor 1130 to obtain various types of information from the terminals. Wireless network 110 may directly or indirectly communicate with SLP 130 via communication unit 1136.

Within SLP 130, processor 1140 may perform processing to support location services for terminals. For example, processor 1140 may perform process 800 in FIG. 8, process 900 in FIG. 9, and/or other processes for the techniques described herein. Processor 1140 may also compute position estimates for terminal 120, provide location information to SUPL agent 140, etc. Memory 1142 may store program codes and data for SLP 130. Communication unit 1144 may allow SLP 130 to communicate with wireless network 110, terminal 120, and/or other network entities. SLP 130 and terminal 120 may exchange messages via a user plane, e.g., SUPL, and these messages may be transported by wireless network 110 via a radio link.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise any physical media such as RAM, ROM, EEPROM, CD-ROM or other optical disk storage, magnetic disk storage or other magnetic storage devices, or any other physical medium that can be used to carry or store desired program code means in the form of instructions or data structures and that can be accessed by a general-purpose or special-purpose computer, or a general-purpose or special-purpose processor. Also, the techniques may be implemented using one or more transmissive media, which may be physical media or vacuum. For example, software may be transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method of supporting location services, comprising:
   receiving a message sent by a terminal to a location server via a user plane, the message indicating service capabilities of the terminal, the service capabilities comprising triggering criteria for determining whether to obtain a location estimate of the terminal, wherein the service capabilities of the terminal comprise at least one capability selected from the group consisting of reporting capabilities of the terminal for periodic triggered service, area event capabilities of the terminal for area event triggered service, and session capabilities of the terminal for number of simultaneous location sessions supported by the terminal;
   determining whether a location service is supported by the terminal based at least in part on the service capabilities of the terminal, wherein the location service is configured to obtain the location estimate of the terminal at least partially in response to an occurrence of the triggering criteria; and
   communicating with the terminal via the user plane for the location service at least partially in response to determining that the location service is supported by the terminal.

2. The method of claim 1, wherein the receiving the message occurs during a first location session, and wherein the determining and the communicating occur during a second location session after the first location session.

3. The method of claim 1, wherein the receiving the message, the determining, and the communicating occur during a single location session.

4. The method of claim 1, further comprising:
   receiving from a location client a request for a particular location service for the terminal;
   determining whether the particular location service is supported by the terminal based on the service capabilities of the terminal;
   terminating the request if the particular location service is not supported by the terminal; and
   initiating a location session for the particular location service if supported by the terminal.

5. The method of claim 1, wherein the service capabilities of the terminal comprise at least one location service supported by the terminal.

6. The method of claim 1, wherein the service capabilities of the terminal indicate whether the terminal supports each of periodic triggered service and area event triggered service.

7. The method of claim 1, wherein the receiving the message comprises receiving a Secure User Plane Location (SUPL) START message, a SUPL TRIGGERED START message, a SUPL POS INIT message, a SUPL END message, a SUPL AUTH REQ message, or a SUPL INFO message sent by the terminal to the location server.

8. An apparatus for wireless communication, comprising:
at least one processor to:
process a received message sent by a terminal to a location server via a user plane, the message indicating service capabilities of the terminal, the service capabilities comprising triggering criteria for determining whether to obtain a location estimate of the terminal;
determine whether a location service is supported by the terminal based at least in part on the service capabilities of the terminal, wherein the location service is configured to obtain the location estimate of the terminal at least partially in response to an occurrence of the triggering criteria;
wherein the at least one processor is configured to determine, from the service capabilities of the terminal, at least one terminal capability selected from the group consisting of location services supported by the terminal, reporting capabilities of the terminal for periodic triggered service, area event capabilities of the terminal for area event triggered service, and session capabilities of the terminal for a number of simultaneous location sessions supported by the terminal; and
communicate with the terminal via the user plane for the location service at least partially in response to determining that the location service is supported by the terminal.

9. The apparatus of claim 8, wherein the at least one processor is configured to receive, from a location client, a request for a particular location service for the terminal, to determine whether the particular location service is supported by the terminal based on the service capabilities of the terminal, to terminate the request at least partially in response to determining that the location service is the particular location service is not supported by the terminal, and to initiate a location session for the particular location service at least partially in response to determining that the location service is supported by the terminal.

10. An apparatus for communication, comprising:
means for receiving a message sent by a terminal to a location server via a user plane, the message indicating service capabilities of the terminal, the service capabilities comprising triggering criteria for determining whether to obtain a location estimate of the terminal, wherein the service capabilities of the terminal comprise at least one capability selected from the group consisting of reporting capabilities of the terminal for periodic triggered service, area event capabilities of the terminal for area event triggered service, and session capabilities of the terminal for number of simultaneous location sessions supported by the terminal;
means for determining whether a location service is supported by the terminal based at least in part on the service capabilities of the terminal, wherein the location service is configured to obtain the location estimate of the terminal at least partially in response to an occurrence of the triggering criteria; and
means for communicating with the terminal via the user plane for the location service at least partially in response to determining that the location service is supported by the terminal.

11. The apparatus of claim 10, further comprising:
means for receiving from a location client a request for a particular location service for the terminal;
means for determining whether the particular location service is supported by the terminal based on the service capabilities of the terminal;
means for terminating the request at least partially in response to determining that the particular location service is not supported by the terminal; and
means for initiating a location session for the particular location service at least partially in response to determining that the location service is supported by the terminal.

12. A computer program product, comprising:
a non-transitory computer-readable medium comprising one or more instructions executable by one or more processors to:
process a received message sent by a terminal to a location server via a user plane, the message indicating service capabilities of the terminal, the service capabilities comprising triggering criteria for determining whether to obtain a location estimate of the terminal, wherein the service capabilities of the terminal comprise at least one capability selected from the group consisting of reporting capabilities of the terminal for periodic triggered service, area event capabilities of the terminal for area event triggered service, and session capabilities of the terminal for number of simultaneous location sessions supported by the terminal;
determine whether a location service is supported by the terminal based at least in part on the service capabilities of the terminal, wherein the location service is configured to obtain the location estimate of the terminal at least partially in response to an occurrence of the triggering criteria; and
initiate communication with the terminal via the user plane for the location service at least partially in response to determining that the location service is supported by the terminal.

13. The computer program product of claim 12, wherein the instructions are further executable by the processor to:
process a received request from a location client for a particular location service for the terminal,
determine whether the particular location service is supported by the terminal based at least in part on the service capabilities of the terminal,
terminate the request at least partially in response to determining that the particular location service is not supported by the terminal, and
initiate a location session for the particular location service at least partially in response to determining that the location service is supported by the terminal.

14. A method of supporting location services, comprising:
generating a message comprising service capabilities of a terminal, the message indicating service capabilities of the terminal, the service capabilities comprising triggering criteria for determining whether to obtain a location estimate of the terminal, wherein the service capabilities of the terminal comprise at least one capability selected from the group consisting of reporting capabilities of the terminal for pleriodic triggered service, area event capabilities of the terminal for area event triggered service, and session capabilities of the terminal for number of simultaneous location sessions supported by the terminal;
sending the message from the terminal to a location server via a user plane; and
communicating with the location server via the user plane for a location service,
wherein the location service is determined by the location server to be supported by the terminal based at least in part on the service capabilities of the terminal.

15. The method of claim 14, wherein the generating the message and the sending the message occur during a first location session, and wherein the communicating occur during a second location session after the first location session.

16. The method of claim 14, wherein the generating the message, the sending the message, and the communicating occur during a single location session.

17. The method of claim 14, further comprising:
detecting a change in the service capabilities of the terminal; and
sending a message comprising updated service capabilities of the terminal to the location server.

18. The method of claim 14, wherein the message comprising the service capabilities of the terminal comprises a first message sent by the terminal for a location session.

19. The method of claim 14, wherein the message comprising the service capabilities of the terminal is sent to terminate a location session.

20. The method of claim 14, wherein the message comprising the service capabilities of the terminal is sent to terminate a location session initiated by the location server for a location service not supported by the terminal.

21. The method of claim 14, wherein the service capabilities of the terminal indicate whether the terminal supports each of periodic triggered service and area event triggered service.

22. An apparatus for communication, comprising:
at least one processor to:
generate a message comprising service capabilities of a terminal, the message indicating service capabilities of the terminal, the service capabilities comprising triggering criteria for determining whether to obtain a location estimate of the terminal, wherein the service capabilities of the terminal comprise at least one capability selected from the group consisting of reporting capabilities of the terminal for periodic triggered service, area event capabilities of the terminal for area event triggered service, and session capabilities of the terminal for number of simultaneous location sessions supported by the terminal;
initiate transmission of the message from the terminal to a location server via a user plane; and
initiate communication with the location server via the user plane for a location service,
wherein the location service is determined by the location server to be supported by the terminal based at least in part on the service capabilities of the terminal.

23. The apparatus of claim 22, wherein the at least one processor is configured to detect a change in the service capabilities of the terminal, and is further configured to initiate transmission of a message comprising updated service capabilities of the terminal to the location server.

* * * * *